OR 3,814,494

T 3028 H

United States Patent

Shiragai et al.

[11] 3,814,494

[45] June 4, 1974

[54] METHOD AND APPARATUS FOR OPTICALLY AND UNIFORMLY SCANNING A FLAT SURFACE

[75] Inventors: Yasuo Shiragai; Takeshi Maeno, both of Odawara, Japan

[73] Assignee: Hitachi Ltd., Tokyo, Japan

[22] Filed: Sept. 15, 1972

[21] Appl. No.: 289,262

[30] Foreign Application Priority Data

Sept. 16, 1971 Japan .......................... 46-71179

[52] U.S. Cl. ...................... 350/6, 350/285, 350/289

[51] Int. Cl. .......................................... G02b 17/00

[58] Field of Search ............ 350/6, 7, 285, 288, 289

[56] References Cited

UNITED STATES PATENTS

| | | | |
|---|---|---|---|
| 1,136,761 | 4/1915 | Becker | 350/6 |
| 2,911,470 | 11/1959 | Greenleaf | 350/6 |
| 2,930,845 | 3/1960 | Akira | 350/7 |
| 3,051,044 | 8/1962 | McNaney | 350/6 |
| 3,353,022 | 11/1967 | Schwartz | 350/6 |
| 3,729,248 | 4/1973 | Beduchaud | 350/7 |

*Primary Examiner*—Ronald L. Wibert
*Assistant Examiner*—Michael J. Tokar
*Attorney, Agent, or Firm*—Craig and Antonelli

[57] ABSTRACT

A method and apparatus for uniformly scanning a flat surface of a paper sheet wherein the flat surface of the paper sheet is optically uniformly scanned using a light beam reflected by a rotating mirror non-uniformly rotated by means of a link mechanism or cam mechanism without curving the surface of the paper sheet or without effecting any electrical controlling.

5 Claims, 7 Drawing Figures

METHOD AND APPARATUS FOR OPTICALLY AND UNIFORMLY SCANNING A FLAT SURFACE

BACKGROUND OF THE INVENTION

1. Field of the Invention

The present invention relates to a light-spot scanning method and apparatus for use with an optical character reading device or mark reading device.

2. Description of the Prior Art

In order to effect uniform scanning on the surface of a paper sheet, conventional optical character reading devices or mark reading devices, as shown in FIG. 1, have employed a scanning light beam produced by deflecting a radiating beam 3 emanating from a light source 2 remaining stationary relative to the surface of the paper sheet in an arcuated configuration by means of a mirror rotating at a constant angular velocity. Alternatively, the uniform scanning has been carried out in which the mirror 1 was uniformly rotated to scan the surface of the paper sheet positioned in a flat form, and informations obtained in succession by such nonuniform scanning were so corrected by electrical controlling as to be of uniform pitch in order that they may be transmitted to the reading devices. It is quite obvious that the uniform scanning on the surface of the paper sheet generally has an advantage from a point of view of expensiveness or reliability in recognizing the characters or in reading the marks. Thus the conventional optical character reading devices or mark reading devices have employed the former method, that is, the method wherein the paper sheet is bent out in the arcuated form and scanned by the uniformly rotating mirror positioned at the center of curvature of the arcuated paper sheet. Such a method for scanning the arcuated paper sheet, however, has a drawback in that it is difficult to bend out the paper in proper curvature. Further the reading device equipped with an automatic feeder requires elongated portions for correcting the skew of the sheet because of the difficulty of the correction of the skew in the paper sheet, thus disadvantageously resulting in a bulky device.

SUMMARY OF THE INVENTION

An object of the present invention is to provide an optical scanning method by which the surface of a paper sheet positioned flat is uniformly scanned with the above-mentioned drawbacks removed.

Another object of the present invention is to provide an optical scanning device by which the surface of a paper sheet positioned flat is uniformly scanned.

According to the present invention, a method for uniformly scanning the flat surface of a paper sheet comprises the step of deflecting a light beam emanating from a point light source by means of a rotating mirror to thereby scan said flat surface, said rotating mirror being driven at an angular velocity given by an expression $$d\phi/dt = v/2l_1 \cos^2 2\phi$$

where $\phi$ represents the angle of rotation of the rotating mirror measured from a standard position, $l_1$ represents the length of a perpendicular from the center of the rotating mirror to the surface of the paper sheet, and $v$ represents the scanning velocity of a light beam running on the surface thereof.

Further a device for uniformly scanning a flat surface according to the present invention comprises a first link pivotally mounted on the axis center, a rotating mirror driven by said first link, a second link pivotally mounted on the axis center different from that of said first link and having a portion contacting one end of said first link, and a slider engaged with one end of said second link for effecting linear motion at a constant velocity, the distance between the axial centers of said first and second links being equal to that from the axial center of said second link to the portion of said second link contacting said first link.

DESCRIPTION OF THE PREFERRED EMBODIMENTS

Figure 1:
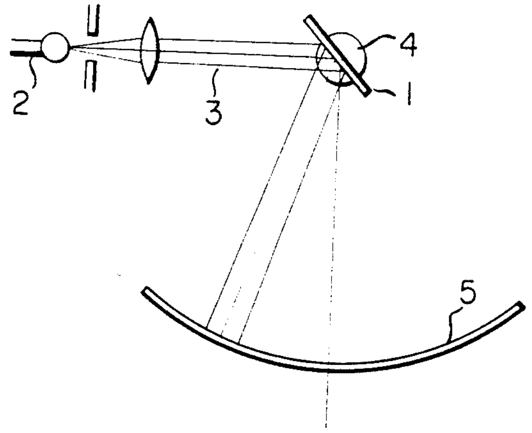
FIG. 1 PRIOR ART
FIG. 1 is a schematic view illustrating a conventional scanning method with a rotating mirror.
Figure 2A:
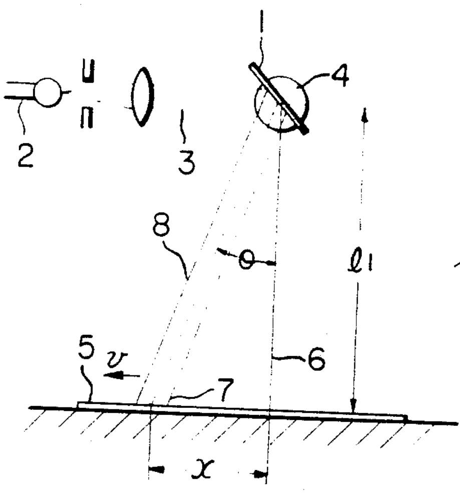
FIG. 2*a* is a schematic view illustrating a scanning method according to the present invention.
Figure 2B:
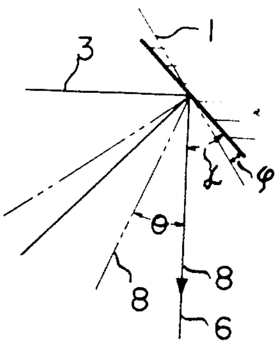
FIG. 2*b* is a detail view of a portion of FIG. 2*a*.

Referring to FIG. 2, it will be appreciated that a light beam 3 emanating from a stationary light source 2 effects uniform scanning on the surface of a paper sheet 5 if the mirror axis 4 is rotated at an angular velocity $d\phi/dt$ given by an expression $$d\phi/dt = v/2l_1 \cos^2 2\phi$$

where $\phi$ represents the angle of rotation of a mirror 1 measured from an initial value $\alpha$, $\alpha$ being an initial value of the angle of the reflecting mirror surface relative to the light beam, and v (constant) represents the scanning velocity on the surface of the paper sheet. If $\theta$ is given as the angle of reflected light relative to the perpendicular 6 from the center of the mirror axis 4 to the surface of the paper sheet, then it is seen that $\theta = 2\phi$. Further the position $x$ of the light spot 7 on the sheet surface, as shown in FIG. 2, is given as follows:

$$x = l_1 \tan \theta$$
$$= l_1 \tan 2\phi$$

It follows that the shifting velocity of the light spot 7 is $$dx/dt = 2l_1/\cos^2 2\phi d\phi/dt = v \text{ (constant)}$$

Hence $$d\phi/dt = v/2l_1 \cos^2 2\phi$$

Thus it is understood that the rotation of the mirror axis 4 at the angular velocity given by the above expression allows a uniform scanning on the flat surface. The initial value $\alpha$ of the angle of the reflecting mirror surface refers to the angle between the reflecting surface of the mirror 1 and the perpendicular 6 from the center of the mirror axis to the surface of the sheet when the reflected light coincides with the perpendicular 6.

Next, the present invention will be described in connection with embodiments of the method and apparatus for uniformly scanning the flat surface.

Figure 3:
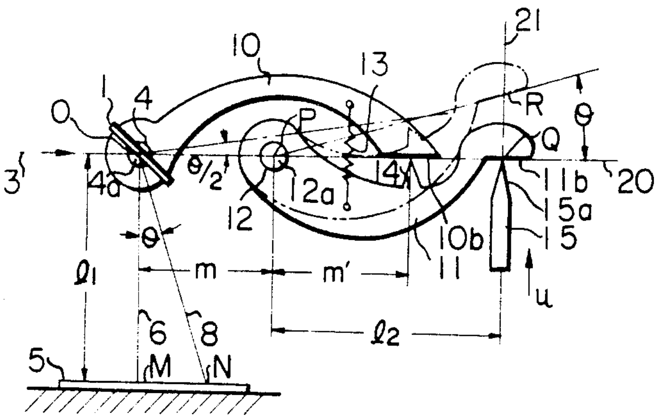
FIGS. 3 to 6 are, respectively, schematic views showing embodiments of an scanning method and apparatus according to the present invention.

In FIG. 3 there is shown an embodiment employing a link mechanism wherein a flat mirror 1 includes the center 4*a* of a mirror axis 4 therein and is secured to a link 10 pivotally mounted on the axis 4. Another link 11 is also pivotally mounted on the axis 12. These two links are connected by a tension spring 13 with a force sufficient enough to urge a projection 14 of the link 11 to make a constant contact with the flat surface 10*b* positioned at the lower portion of the link 10. A slider 15 has a top end 15*a* moving on a straight line 21 at a uniform velocity with the flat surface 11*b* of the lower portion of the link 11 kept in contact therewith. The link 11 is constructed so that the plane extending along the flat surface 11*b* thereof passes through the center 12*a* of the axis 12. Similarly the link 10 is also constructed so that the plane extending along the flat surface 10*b* thereof passes through the center 4*a* of the axis 4. Further the link mechanism is so arranged that four points, i.e., the center 4*a* of the axis 4, the center 12*a* of the axis 12, the point of the projection 14 contacting with the flat surface 10*b*, and the point of the top end 15*a* of the slider 15 contacting with the flat surface 11*b* come into alignment with a straight line 20 at a certain instant during the movement of the slider 15 held in contact with the link 11. Further the line 20 is positioned perpendicularly with respect to the line 21 on which the slider 15 advances, and the distance m between the centers 4*a* and 12*a* is made equal to the distance *m'* between the center 12*a* and the projection 14. With this arrangement, the ratio of the angle of rotation of the link 10 to that of the link 11 is always kept 1 to 2. Thus the ratio of the rotation of the link 10 (that is, the angle of rotation of the mirror) to that of the reflected light 8 is 1 to 2 with the angle of rotation of the reflected light 8 equal to the angle of rotation of the link 11. It follows that a triangle OMN is similar to a triangle PQR, and the uniform motion of the slider 15 causes the uniform motion of the light spot on the surface of the paper sheet 5 due to the principle of the homologous triangle. Let $y$ be the displacement of the slider 15, and it follows that $$y = l_2 \tan \theta$$

$$= l_2 \tan 2\phi$$

$$dy/dt = 2l_2 \, 1/\cos^2 2\phi \cdot d\phi/dt = u \text{ (constant)}$$

$$\therefore d\phi/dt = u/2l_2 \cos^2 2\phi$$

It can be understood that it agrees with the abovementioned expression of the angular velocity of rotation of the mirror.

Figure 4:
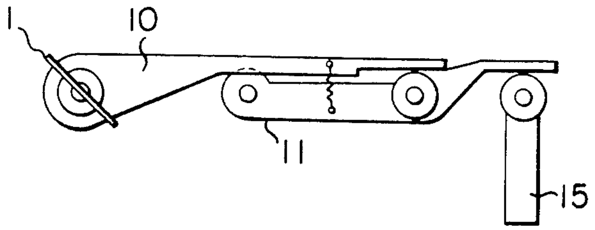

In the embodiment of FIG. 3, the projection 14 is held in point contact with the surface 10*b* and the top end 15*a* of the slider 15 is held in contact with surface 11*b*, thus resulting in rapid wear of these elements. This drawback is eliminated by holding the projection in rolling contact with the top end of the slider as shown in FIG. 4.

Figure 5:
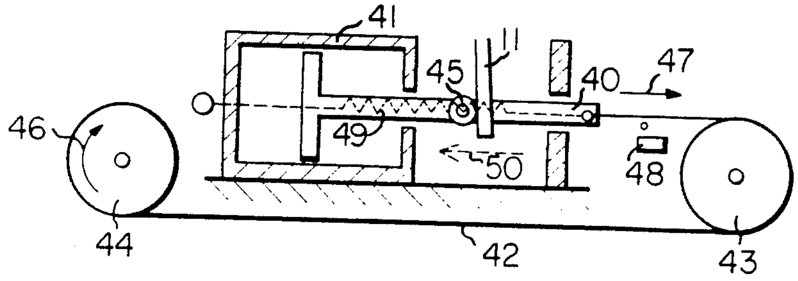

FIG. 5 shows a mechanism for uniformly effecting a linear motion of the slider 15, comprising a piston 40 and a dash pot 41. The piston 40 is linked to a wire cable 42 which is, in turn, wound on a take-up roller 44 with a claw clutch through an idler roller 43. On the piston is mounted a roller 45 in engagement with a link 11. The uniform rotation of the take-up roller 4 with the claw clutch in the direction of the arrow 46 causes the piston 40 to be trailed by the wire cable 42 to effect the uniform linear motion in the direction of the arrow 47, thus rotating the link 11 uniformly by means of the roller 45. The travel of the piston 40 to the predetermined position causes a detector 48 to operate to disengage the take-up roller 44 with the claw clutch, thereby stopping the winding of the wire cable 42, whereupon the piston 40 is drawn back in the direction of the arrow 50 under the action of a spring 49 to return to its original position.

Figure 6:
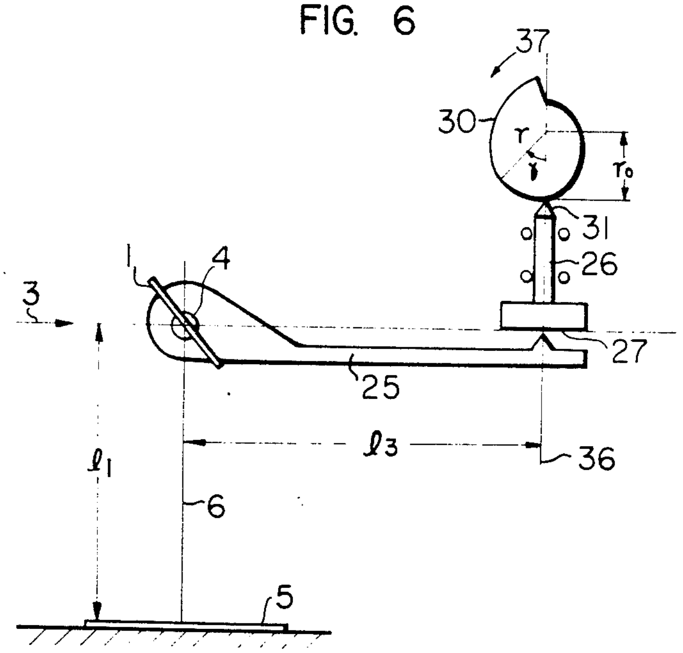

In FIG. 6 there is shown another embodiment employing a cam mechanism wherein the mirror 1, rotated about the axis 4, has a reflecting surface thereon and has an arm 25 secured thereto. Further the cam mechanism includes a cam 30 and a cam-follower 26 for transforming the displacement of the cam 30 to the displacement on a straight line 36. For the purpose of simplification of the description, a point 31 of the cam 30 contacting the cam follower 26 and a point 27 of the cam follower contacting the arm 25 are, respectively, formed as knife-edged elements so as to make a point-to-point contact possible between these members.

The mirror 1 is disposed in such a way that the light beam reflected by the surface of the mirror coincides with the perpendicular 6 on the sheet surface 5 when the cam mechanism is disposed at the position shown in FIG. 6. Assuming that, at this position, the angle $\gamma$ of rotation of the cam is zero, $r_o$ is the radius of the cam, and $\gamma$ is positive when it is measured in the direction opposite to the direction of rotation (shown by the arrow 37), it follows that the angle 4 of rotation of the mirror 1 is $$(r - r_o)/l_3 = \sin \phi$$

Integrating the previously obtained expression, $$d\phi/dt = v/2l_1 \cos^2 2\phi$$

$$\tan 2\phi = vt/l_1$$

Assuming that the cam rotates uniformly, $$\gamma = \omega t$$

where $\omega$ is the angular velocity of rotation.

Eliminating $\phi$, t from the above expressions in order to obtain $f(r, \gamma) = 0$, $$r = r_0 + \frac{l3}{\sqrt{2}} \sqrt{1 - \frac{\omega}{\sqrt{\omega 2 + \frac{v^2}{l_1^2} \gamma^2}}} \quad (\gamma \geqq 0)$$

$$r = r_0 - \frac{l3}{\sqrt{2}} \sqrt{1 - \frac{\omega}{\sqrt{\omega 2 + \frac{v^2}{l_1^2} \gamma^2}}} \quad (\gamma < 0)$$

If the arm 25 is driven through a follower 26 by means of the cam configured so as to have a profile given by the above expressions, then the reflecting surface of the mirror 1 is driven in accordance with the above expression defining the angular velocity of rotation. It must be noted that the cam has a continuous curved configuration a continuous gradient.

As mentioned above, the method and apparatus for uniformly scanning the flat surface according to the present invention makes possible the uniform scanning on the flat surface of the paper sheet without curving the surface of the paper sheet or without effecting any electrical controlling.

We claim:

1. A method for uniformly scanning a flat surface comprising the step of directing a light beam emanating from a point light source at a rotatable flat mirror to thereby direct a light spot to said flat surface, rotating said mirror to move said light spot over said flat surface with an angular velocity defined by the expression $$d\phi/dt = v/2l \cos^2 2\phi$$

where $\phi$ represents the angle of rotation of the rotating mirror measured from an initial position, $l$ represents the length of the perpendicular from the center of the rotating mirror to the flat surface to be scanned, and $v$ represents a scanning velocity of a light spot running on the flat surface.

2. A device for uniformly scanning a flat surface comprising a first link pivotally mounted for rotation about a first axis, a mirror connected to said first link at said first axis for rotation therewith, a second link pivotally mounted for rotation about a second axis parallel to said first axis and having a portion disposed between said second axis and one end thereof contacting one end of said first link, and a linearly movable slider engaged with said one end of said second link for effecting linear motion of said second link at a constant velocity, the distance between the centers of said first and second axes being equal to the distance from said second axis to the portion of said second link contacting said first link.

3. An apparatus for uniformly scanning a flat surface comprising an arm mounted for rotation about an axis, a flat mirror mounted on said arm at said axis, and a cam engaged with one end of said arm for rotating said arm, said cam having a profile defined by the expression $$r = r_0 + \frac{l3}{\sqrt{2}} \sqrt{1 - \frac{\omega}{\sqrt{\omega 2 + \frac{v^2}{l_1^2}\gamma^2}}} \quad (\gamma \geqq 0)$$

$$r = r_0 - \frac{l3}{\sqrt{2}} \sqrt{1 - \frac{\omega}{\sqrt{\omega 2 + \frac{v^2}{l_1^2}\gamma^2}}} \quad (\gamma < 0)$$

where $r_o$ represents the radius of the cam when the rotating mirror is located at an initial position, $l_3$ represents the distance measured from said axis of the arm to the surface thereof engaging with the cam, $\gamma$ represents the angle of rotation of the cam, $\omega$ represents the angular velocity of rotation of the cam, and $l_1$ represents the length of the perpendicular from the center of the rotating mirror to the flat surface.

4. A device as defined in claim 2, further including a spring member interconnecting said first and second links to effect coordinate movement thereof in response to movement of said slider.

5. A device as defined in claim 4 wherein said slider comprises a piston having a roller mounted thereon in contact with said second link, a cylinder containing a portion of said piston and means for effecting reciprocation of said piston portion in said cylinder to actuate said second link.

* * * * *